US008933162B2

(12) United States Patent
Alidedeoglu et al.

(10) Patent No.: US 8,933,162 B2
(45) Date of Patent: *Jan. 13, 2015

(54) COLOR-STABILIZED BIODEGRADABLE ALIPHATIC-AROMATIC COPOLYESTERS, METHODS OF MANUFACTURE, AND ARTICLES THEREOF

(75) Inventors: Husnu Alp Alidedeoglu, Evansville, IN (US); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,638

(22) Filed: Mar. 28, 2012

(65) Prior Publication Data

US 2013/0018131 A1    Jan. 17, 2013

Related U.S. Application Data

(63) Continuation-in-part of application No. 13/183,786, filed on Jul. 15, 2011, now abandoned.

(51) Int. Cl.
*C08G 18/42* (2006.01)
*C08G 63/183* (2006.01)
*C08G 63/85* (2006.01)
*C08G 63/87* (2006.01)
*C08L 67/02* (2006.01)

(52) U.S. Cl.
CPC .............. *C08G 63/183* (2013.01); *C08G 63/85* (2013.01); *C08G 63/87* (2013.01); *C08L 67/02* (2013.01)
USPC ........... 524/500; 528/279; 524/315; 524/537; 524/538; 524/539

(58) Field of Classification Search
None
See application file for complete search history.

(56) References Cited

U.S. PATENT DOCUMENTS

| 2,012,267 | A | 8/1929 | Carothers |
|---|---|---|---|
| 3,634,089 | A | 1/1972 | Hamb |
| 3,669,921 | A | 6/1972 | Droke et al. |
| 3,833,685 | A | 9/1974 | Wambach |
| 3,951,886 | A | 4/1976 | Miyake et al. |
| 3,953,539 | A | 4/1976 | Kawase et al. |
| 3,989,664 | A | 11/1976 | Kawase et al. |
| 4,128,526 | A | 12/1978 | Borman |
| 4,178,277 | A | 12/1979 | Gebauer et al. |
| 4,328,059 | A | 5/1982 | Horlbeck et al. |
| 4,401,804 | A | 8/1983 | Wooten et al. |
| 4,452,933 | A | 6/1984 | McCready |
| 4,482,700 | A | 11/1984 | Kuhnrich et al. |
| 4,500,575 | A | 2/1985 | Taira et al. |
| 4,617,373 | A | 10/1986 | Pruett et al. |
| 4,659,615 | A | 4/1987 | Ishii et al. |
| 5,266,601 | A | 11/1993 | Kyber et al. |
| 5,268,420 | A | 12/1993 | Nishimura et al. |
| 5,271,985 | A | 12/1993 | Tsunashima et al. |
| 5,378,796 | A | 1/1995 | George et al. |
| 5,391,263 | A | 2/1995 | Hepner et al. |
| 5,391,362 | A | 2/1995 | Reinalda et al. |
| 5,413,681 | A | 5/1995 | Tustin et al. |
| 5,446,079 | A | 8/1995 | Buchanan et al. |
| 5,451,611 | A | 9/1995 | Chilukuri et al. |
| 5,453,479 | A | 9/1995 | Borman et al. |
| 5,498,749 | A | 3/1996 | Heise et al. |
| 5,554,657 | A | 9/1996 | Brownscombe et al. |
| 5,559,159 | A | 9/1996 | Sublett et al. |
| 5,744,503 | A | 4/1998 | Smith et al. |
| 5,817,721 | A | 10/1998 | Warzelhan et al. |
| 5,844,023 | A | 12/1998 | Tomka |
| 5,866,710 | A | 2/1999 | Ridland et al. |
| 5,869,543 | A | 2/1999 | Boos et al. |
| 6,020,393 | A | 2/2000 | Khemani |
| 6,066,714 | A | 5/2000 | Putzig et al. |
| 6,096,809 | A | 8/2000 | Lorcks et al. |
| 6,120,895 | A | 9/2000 | Kowitz et al. |
| 6,133,404 | A | 10/2000 | Kang et al. |
| 6,166,170 | A | 12/2000 | Putzig |
| 6,201,034 | B1 * | 3/2001 | Warzelhan et al. ........... 521/138 |
| 6,231,970 | B1 | 5/2001 | Andersen et al. |
| 6,235,815 | B1 | 5/2001 | Loercks et al. |
| 6,303,738 | B1 | 10/2001 | Putzig et al. |
| 6,384,129 | B1 | 5/2002 | Lowry |
| 6,472,497 | B2 | 10/2002 | Loercks et al. |
| 6,472,557 | B1 | 10/2002 | Pell, Jr. et al. |
| 6,518,322 | B1 | 2/2003 | West |
| 6,521,717 | B1 | 2/2003 | Itoh |
| 6,573,340 | B1 | 6/2003 | Khemani et al. |
| 6,582,818 | B2 | 6/2003 | Haile et al. |
| 6,649,731 | B2 | 11/2003 | Hori et al. |

(Continued)

FOREIGN PATENT DOCUMENTS

DE  19638488 A1  3/1998
EP  0103531 B1  3/1984

(Continued)

OTHER PUBLICATIONS

U.S. Appl. No. 13/409,898, filed with USPTO Mar. 1, 2012.
U.S. Appl. No. 13/409,983; filed with USPTO Mar. 1, 2012.
U.S. Appl. No. 13/433,390, filed with USPTO Mar. 29, 2012.
U.S. Appl. No. 13/435,865; filed with USPTO Mar. 30, 2012.
Chang et al.; "Copolyesters. VII. Thermal Transitions of Poly(butylene terephthalate-co-isophthalate-co-adipate)s"; vol. 51; Issue. 6; Feb. 1994; pp. 999-1004.

(Continued)

*Primary Examiner* — Susannah Chung
*Assistant Examiner* — Robert T Butcher
(74) *Attorney, Agent, or Firm* — Cantor Colburn LLP; Diderico van Eyl

(57) ABSTRACT

Biodegradable compositions containing an aliphatic-aromatic copolyester. Methods of making the compositions and articles made from the compositions.

21 Claims, No Drawings

(56) References Cited

U.S. PATENT DOCUMENTS

| | | |
|---|---|---|
| 6,660,211 B2 | 12/2003 | Topolkaraev et al. |
| 6,703,115 B2 | 3/2004 | Hale et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,841,597 B2 | 1/2005 | Bastioli et al. |
| 6,998,462 B2 | 2/2006 | Duan et al. |
| 7,037,959 B1 | 5/2006 | Willett et al. |
| 7,160,977 B2 | 1/2007 | Hale et al. |
| 7,166,690 B2 | 1/2007 | Kim |
| 7,176,251 B1 | 2/2007 | Bastioli et al. |
| 7,241,832 B2 | 7/2007 | Khemani et al. |
| 7,241,838 B2 | 7/2007 | Shelby et al. |
| 7,354,653 B2 | 4/2008 | Germroth et al. |
| 7,368,503 B2 | 5/2008 | Hale |
| 7,368,511 B2 | 5/2008 | Hale et al. |
| 7,737,246 B2 | 6/2010 | Crawford |
| 7,799,836 B2 | 9/2010 | Agarwal et al. |
| 7,910,645 B2 | 3/2011 | Ahmed et al. |
| 8,038,658 B2 | 10/2011 | Kohama |
| 8,088,834 B2 | 1/2012 | Agarwal et al. |
| 2001/0014388 A1 | 8/2001 | Bastioli et al. |
| 2002/0111409 A1 | 8/2002 | Talibuddin |
| 2004/0092672 A1 | 5/2004 | Bastioli et al. |
| 2004/0254330 A1* | 12/2004 | Duan et al. .................. 528/275 |
| 2005/0113534 A1* | 5/2005 | Agarwal et al. .............. 525/439 |
| 2005/0137304 A1 | 6/2005 | Strand et al. |
| 2006/0257676 A1 | 11/2006 | Itada et al. |
| 2007/0010648 A1 | 1/2007 | Partridge et al. |
| 2007/0066794 A1* | 3/2007 | Jernigan .................. 528/274 |
| 2007/0079945 A1 | 4/2007 | Noda et al. |
| 2007/0082573 A1 | 4/2007 | Noda et al. |
| 2007/0082981 A1 | 4/2007 | Noda et al. |
| 2007/0093634 A1 | 4/2007 | Salsman et al. |
| 2007/0208160 A1 | 9/2007 | Agarwal et al. |
| 2007/0244242 A1 | 10/2007 | Agarwal et al. |
| 2007/0264460 A1 | 11/2007 | Del Tredici |
| 2007/0275242 A1 | 11/2007 | Gopal et al. |
| 2007/0276069 A1 | 11/2007 | Agarwal et al. |
| 2008/0039571 A1 | 2/2008 | Cohoon et al. |
| 2008/0274320 A1 | 11/2008 | Yokoyama et al. |
| 2008/0311385 A1 | 12/2008 | Miyazaki et al. |
| 2009/0274885 A1 | 11/2009 | Egawa |
| 2009/0275698 A1 | 11/2009 | Ravi et al. |
| 2010/0041831 A1 | 2/2010 | Chung et al. |
| 2010/0168317 A1 | 7/2010 | Cahoon-Brister |
| 2010/0168336 A1 | 7/2010 | Cohoon-Brister |
| 2011/0071235 A1 | 3/2011 | Kannan et al. |
| 2011/0120346 A1 | 5/2011 | Reisacher et al. |
| 2011/0178265 A1 | 7/2011 | Tanaka et al. |
| 2012/0232191 A1 | 9/2012 | Auffermann et al. |
| 2013/0030116 A1 | 1/2013 | Okaniwa et al. |

FOREIGN PATENT DOCUMENTS

| | | |
|---|---|---|
| EP | 0331746 B1 | 6/1984 |
| EP | 0272417 A2 | 6/1988 |
| EP | 0573680 A1 | 12/1993 |
| EP | 0634435 A1 | 1/1995 |
| EP | 0736557 A1 | 10/1996 |
| EP | 0575349 B2 | 8/2003 |
| EP | 1344765 A1 | 9/2003 |
| EP | 1426404 A1 | 6/2004 |
| EP | 1437377 A1 | 7/2004 |
| EP | 1473324 A1 | 11/2004 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| WO | 0185824 A2 | 11/2001 |
| WO | 2005017034 A1 | 2/2005 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2009127556 A1 | 10/2009 |
| WO | 2010034711 A1 | 4/2010 |
| WO | 2010077809 A1 | 7/2010 |
| WO | 2011054786 A1 | 5/2011 |
| WO | 2013012706 A1 | 1/2013 |
| WO | 2013012707 A1 | 1/2013 |
| WO | 2013033285 A1 | 3/2013 |

OTHER PUBLICATIONS

English Abstract of EP0007445 A1; Date of Publication Feb. 6, 1980; 1 page.

English Abstract of EP0519367 A1; Date of Publication Dec. 23, 1992; 2 pages.

English Abstract of EP2258545 A1; Date of Publication Dec. 8, 2010; 2 pages.

English Abstract of JP2000109665 A; Date of Publication Apr. 18, 2000; 1 page.

English Abstract of JP2003220645 A; Date of Publication Aug. 5, 2003; 1 page.

English Abstract of JP2004050769 A; Date of Publication Feb. 19, 2004; 1 page.

English Abstract of JP2004098321 A; Date of Publication Apr. 2, 2004; 2 pages.

English Abstract of JP2004204038 A; Date of Publication; 1 page.

English Abstract of JP2005052479 A; Date of Publication Mar. 3, 2005; 2 pages.

English Abstract JP2005220278 A; Aug. 18, 2005; 1 page.

English Abstract JP2008045117 A; Date of Publication Feb. 28, 2008; 2 pages.

English Abstract of JP3776578 B2; Date of Publication May 17, 2006; 1 page.

International Search Report for International Application No. PCT/JP2009/064418; International Date of Publication Nov. 10, 2009; Date of Mailing Nov. 17, 2009; 2 pages.

International Search Report for International Application No. PCT/US2012/026046; Date Mailed May 18, 2012; 5 pages.

Written Opinion of the International Search Report for International Application No. PCT/US2012/026046; Date of Mailing May 18, 2012; 8 pages.

International Search Report for International Application No. PCT/US2012/026048; Date Mailed May 18, 2012; 5 pages.

Written Opinion for International Application No. PCT/US2012/026048; Date Mailed May 18, 2012; 8 pages.

International Search Report for International Application PCT/US2012/026051; International Filing Date Feb. 22, 2012; Date of Mailing Aug. 3, 2012; 5 pages.

Written Opinion of the International Search Report for PCT/US2012/026051; International Filing Date Feb. 22, 2012; Date of Mailing Aug. 3, 2012; 9 pages.

Ukielski et al.; "Effect of Chemical Modification of Poly(butylene terephthalate) on elastic properties"; International Polymer Science and Technology, vol. 31, No. 3; Jan. 2004; 6 pages.

Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.

U.S. Appl. No. 13/183,807; filed with USPTO Jul. 15, 2011.
U.S. Appl. No. 13/183,821; filed with USPTO Jul. 15, 2011.
U.S. Appl. No. 13/221,159; filed with USPTO Aug. 30, 2011.
JP60147430 Abstract; 1 page; Aug. 3, 1985.

Kleeberg et al.; "Biodegradation of Aliphatic-Aromatic copolyesters by Thermomonospora fusca and Other Thermophilic Compost Isolates"; Applied and Environmental Microbiology; vol. 64, No. 5; 1998, American Society for Microbiology; pp. 1731-1735.

International Search Report for International Application No. PCT/US2012/046625; International Filing Date Jul. 13, 2012; Date of Mailing Dec. 20, 2012; 4 pages.

(56) References Cited

OTHER PUBLICATIONS

Written Opinion of the International Search Report for International Application No. PCT/US2012/046625; International Filing Date Jul. 13, 2012; Date of Mailing Dec. 20, 2012; 6 pages.
International Search Report for International Application No. PCT/US2012/046627; International Filing Date Jul. 13, 2012; Date of Mailing Dec. 12, 2012.
Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
DE 19638488 A1 English Abstract; Date of Publication Mar. 26, 1998 2 pages.
JP19840003496 English Abstract; Date of Publication Aug. 3, 1985; 2 pages.
Machine Translation of JP2004098321; Apr. 2004; 6 pages.
JP9087370A with English Abstract; Date of Publication Mar. 31, 1997; 6 pages.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
Patent Cooperation Treaty, International Bureau, Preliminary Report on Patentability and Written Opinion, PCT/US2012/046627, Date of mailing: Jan. 30, 2014, 8 pages.
Scheirs et al.; "Modern Polyesters: Chemistry and Technology of Polyesters and Copolyesters"; 2003; pp. 293-321.
Patent Cooperation Treaty; International Preliminary Report on Patentability; PCT/US2012/052971; Date of mailing: Mar. 13, 2014, 7 pages.

* cited by examiner

COLOR-STABILIZED BIODEGRADABLE ALIPHATIC-AROMATIC COPOLYESTERS, METHODS OF MANUFACTURE, AND ARTICLES THEREOF

CROSS-REFERENCE TO RELATED APPLICATIONS

This application is a continuation-in-part of U.S. patent application Ser. No. 13/183,786, filed on Jul. 15, 2011, which is incorporated herein by reference in its entirety.

BACKGROUND

This invention relates to biodegradable aliphatic-aromatic copolyester compositions, and methods of manufacture of the copolyesters and compositions. These copolyesters and compositions are useful as molded or extruded plastic objects, films, and fibers. More particularly, this invention relates to biodegradable aliphatic-aromatic copolyester compositions, specifically poly(butylene-co-adipate terephthalate) copolyester compositions that are white in color and useful in various applications.

U.S. Pat. No. 6,020,393 discloses a branched, random aliphatic-aromatic copolyester suitable for foaming into biodegradable disposable articles, including poly(butylene-co-adipate terephthalate) (PBAT). U.S. Pat. No. 6,201,034 discloses processes for preparing PBAT by reacting dimethyl terephthalate (DMT) or terephthalic acid (TPA) and adipic acid (AA) with butanediol (BDO). The biodegradability is induced by the incorporation of adipic acid in poly(butylene terephthalate) (PBT). The polymer thus made has a typical melting point ($T_m$) of about 109° C., and a glass transition temperature (Tg) between −25 to −30° C. The polymerization is conducted using a transesterification (TE) catalyst such as a titanium or tin compound.

The present inventors have observed that biodegradable aliphatic-aromatic copolyester product obtained in such a reaction was discolored, often ranging from pink to red in color. This presents a problem in that the aesthetic appearance of a non-white polymer product is an obstacle to employing the polymer in end-uses where the discoloration is apparent and cannot be readily overcome or masked with pigments, whitening agents or fillers. For at least the foregoing reasons, there remains a long unfelt need to develop processes that produce useful biodegradable aliphatic-aromatic copolyesters.

BRIEF DESCRIPTION OF THE INVENTION

In an embodiment, a biodegradable aliphatic-aromatic copolyester comprises a polymerization reaction product of a:
  (a) a dihydric alcohol;
  (b) an aromatic dicarboxy compound selected from an aromatic dicarboxylic acid, aromatic dicarboxylic (C1-3) alkyl ester, or a combination thereof;
  (c) an adipic acid; and
  (d) a titanium catalyst composition comprising titanium and a color-reducing amount of a compound selected from phosphorus-containing compounds, nitrogen-containing compounds, boron-containing compounds, and combinations thereof; wherein the aliphatic-aromatic copolyester has a number average molecular weight of at least 20,000 Daltons and a polydispersity index from 2 to less than 6.

In another embodiment, a copolyester is provided wherein the titanium catalyst comprises the reaction product of:
  tetraisopropyl titanate and
  a reactant selected from
  (1) phosphorus-containing compounds, at a molar ratio of the phosphorus-containing compound:tetraisopropyl titanate from more than 0.5:1 to less than or equal to 3:1,
  (2) nitrogen-containing compounds, at a molar ratio of the nitrogen-containing compound:tetraisopropyl titanate from more than 0.5:1 to less than or equal to 4:1, and
  (3) boron-containing compounds, at a molar ratio of the boron-containing compound:tetraisopropyl titanate from more than 0.5:1 to less than or equal to 4:1, and
  (4) combinations thereof.

In another embodiment, a copolyester is provided wherein the titanium catalyst comprises the reaction product of:
  tetraisopropyl titanate and
  a reactant selected from
  (1) phosphorus-containing compounds, at a molar ratio of the phosphorus-containing compound:tetraisopropyl titanate from more than 0.5:1 to less than or equal to 3:1,
  (2) nitrogen-containing compounds, at a molar ratio of the nitrogen-containing compound:tetraisopropyl titanate from more than 0.5:1 to less than or equal to 4:1, and
  (3) boron-containing compounds, at a molar ratio of the boron-containing compound:tetraisopropyl titanate from more than 0.5:1 to less than or equal to 4:1, and
  (4) combinations thereof.

In another embodiment, a composition comprising a combination of:
  (i) from more than 10 to 59.99 wt. %, based on the total weight of the composition, of the biodegradable aliphatic-aromatic copolyester described above;
  (ii) from more than 40 to less than 89.99 wt. %, based on the total weight of the composition, of a member selected from aliphatic polyesters, aliphatic polycarbonates, starches, aromatic polyesters, cycloaliphatic polyesters, polyesteramides, aromatic polycarbonates, and combinations thereof;
  (iii) from 0.01 to 5 wt. %, based on the total weight of the composition, of a nucleating agent, antioxidant, UV stabilizer, plasticizer, epoxy compound, melt strength additive, or a combination thereof;
  (iv) from 0.01 to 45 wt. %, based on the total weight of the composition, of an additive selected from alcohols, acetates, alcohol-acetate copolymers, and combinations thereof; and
  (v) from 0.01 to 2 wt %, based on the weight of the composition, of an additive selected from the group, crosslinkers, anti aging agents, retrogradation agents, anti-blocking agents, water, odor-controlling agents, and combinations thereof.

In another embodiment, a process for making the biodegradable aliphatic-aromatic copolyester comprises
  a) reacting
  (1) an aromatic dicarboxy compound selected from an aromatic dicarboxylic acid, aromatic dicarboxylic (C1-3) alkyl ester, or a combination thereof,
  (2) an adipic acid component selected from adipic acid, adipic acid oligomers, and combinations thereof, and
  (3) a dihydric alcohol, in the presence of
  (4) a color-reducing amount of the titanium catalyst composition comprising titanium and a color-reducing amount of a compound selected from phosphorus-containing compounds, nitrogen-containing compounds, boron-containing compounds, and combinations thereof; and
  b) subjecting the reaction mixture to vacuum, optionally with distillation, at a pressure of less than 2 Torr and a temperature of 220 to less than 270° C., to form the molten aliphatic-aromatic copolyester.

These and other features, aspects, and advantages will become better understood with reference to the following description and appended claims.

DETAILED DESCRIPTION OF THE INVENTION

The present inventors have surprisingly found that white aliphatic-aromatic copolyesters are produced in an inventive process that is catalyzed by a special titanium catalyst. In some embodiments, the DMT monomer is recovered from recycled polyethylene terephthalate.

In another embodiment, the biodegradable composition can also be made with renewable materials such as adipic acid, sebacic acid, and bio-glycols such as bio-1,3-propane diol. By using a specific combination of stabilizers, we have discovered that we can also make a composition with a copolyester having a white color, which is extremely useful for film packaging applications.

The term "white," as used in this application, means that the material being described as white exhibits an L* value that is at least 74, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 74, or 80, or 85 to 100. The "L*, a, b" method for describing colors is will known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is, a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4F_{18}$)—), and the term "ethylene glycol group" means the group or residue of ethylene glycol having the formula (—O($C_2H_4$)—).

The preparation of polyesters and copolyesters is well known in the art, such as disclosed in U.S. Pat. No. 2,012,267. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants.

The dihydric alcohol groups incorporated into the copolyester can be derived from any dihydric alcohol that reacts with the aliphatic dicarboxylic acid and the aromatic dicarboxylic acid to form the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. In another embodiment, the dihydric alcohol is selected from 1,4-butanediol, 1,3-propanediol, ethylene glycol, and combinations thereof.

Any of the foregoing dihydric alcohols can be derived from a biological source. In an embodiment all or a portion of the dihydric alcohols are derived from a biological source. "Bio-derived diols" as used herein refers to alcohols other than those named and derived from a biological source, e.g., various pentoses, hexoses, and the like.

The aliphatic-aromatic copolyester contains aromatic dicarboxylic acid groups incorporated into the copolyester when the aromatic polyester reacts with the dihydric alcohol and the aliphatic dicarboxylic acid under conditions sufficient to form the copolyester. Examples of the aromatic dicarboxylic acid group include isophthalic acid groups, terephthalic acid groups, naphthalic acid groups and a combination thereof. The aromatic dicarboxylic group in the polyester may also be derived from corresponding di($C_1$ to $C_3$) alkyl esters. In a preferred embodiment, the aromatic dicarboxylic acid group is derived from terephthalic acid or di($C_1$-$C_3$)alkyl ester thereof.

The aliphatic dicarboxylic acid group is incorporated into the copolyester when the aliphatic dicarboxylic acid reacts with the first dihydric alcohol and aromatic carboxylic acid to form the copolyester. Examples of the aliphatic dicarboxylic acid include components having the general formula $(CH_2)_m(COOH)_2$, where m is an integer from 2 to 10. The aliphatic dicarboxylic acid can be decanedioic acid, adipic acid, or sebacic acid. When the aliphatic dicarboxylic acid is adipic acid, the value of m is 4. When the aliphatic dicarboxylic acid is sebacic acid, the value m is 8. In an embodiment all or a portion of the aliphatic dicarboxylic acid is a bio-derived aliphatic dicarboxylic acid.

In another embodiment, the aromatic dicarboxylic ester groups comprise the polymerization product of dimethyl terephthalate derived from recycled PET and the dihydric alcohol, and further wherein the copolyester further comprises a dimethyl terephthalate residual composition. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate (DMT).

The relative amounts of the aromatic dicarboxylic acid group and the aliphatic dicarboxylic acid group can vary. In an embodiment, the aromatic dicarboxylic group and the aliphatic dicarboxylic group have an aromatic dicarboxylic group: aliphatic dicarboxylic group mole ratio from 0.6:1 to 6:1. In another embodiment, the aromatic dicarboxylic group and the aliphatic dicarboxylic group are present at an aromatic dicarboxylic group: aliphatic dicarboxylic group mole ratio from 0.6:1 to 1.3:1.

Accordingly, in an embodiment, a dimethyl terephthalate residual composition includes residual components selected from dimethyl isophthalate, cyclohexane dimethanol, diethylene glycol, triethylene glycol, and a combination thereof in amounts of from more than 0 to less than 10 weight percent based upon the dimethyl terephthalate.

The copolyester generally has a number average molecular weight of at least 20,000 Daltons and a polydispersity index from 2 to less than 6, specifically 2 to 5. In an embodiment, the copolyester has a glass transition temperature (Tg) from −35° C. to 0° C. In another embodiment, the copolyester has a melting temperature (Tm) from 90° C. to 160° C.

The copolyester can be made by any suitable method using the aromatic dicarboxylic acid, the dihydric alcohol, and the aliphatic diacid at an elevated temperature in the presence of the titanium catalyst, to form a mixture, and subjecting the mixture to a reduced pressure and an elevated temperature to form the copolyester.

The titanium catalyst comprises the reaction product of tetraisopropyl titanate and a reactant selected from:

(1) phosphorus-containing compounds, at a molar ratio of the phosphorus-containing compound:tetraisopropyl titanate from more than 0.5:1 to less than or equal to 3:1, (2) nitrogen-containing compounds, at a molar ratio of the nitrogen-containing compound:tetraisopropyl titanate from more than 0.5:1 to less than or equal to 4:1, and (3) boron-containing compounds, at a molar ratio of the boron-containing compound:tetraisopropyl titanate from more than 0.5:1 to less than or equal to 4:1, and (4) combinations thereof.

Phosphorus-containing compounds include phosphoric acid, poly(phosphoric acid), phosphorous acid, monobutyl phosphate, dibutyl phosphate, monoalkyl phosphates, dialkyl phosphates, or combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

The copolyester can also be made with additional materials that can be present during any of the manufacturing steps, or added after formation of the molten copolyester, or after cooling of the molten copolyester.

For example, in an optional embodiment, the molten copolyester is further reacted with a phosphate compound for an effective time, for example at least 5 minutes, specifically from 5 minutes to two hours. In this embodiment, the aliphatic-aromatic copolyester further comprises a residue of the phosphate compound, either associated with the copolymer or covalently bound to the copolymer. Examples of the compound containing a phosphate group include inorganic phosphate-containing compounds such as phosphoric acid, zinc phosphate, and the like. The phosphate compound can be present in an amount from 0 to 0.10 wt. % of the molten copolyester. Reacting can be at a temperature of, for example, less than or equal to 250° C.

In another optional embodiment, the molten copolyester is further reacted with an addition copolymer comprising the residue of a glycidyl ester monomer for an effective time, for example at least 5 minutes, specifically from 5 minutes to two hours. In this embodiment, the aliphatic-aromatic copolyester further comprises a residue of the addition copolymer, either associated with the copolymer or covalently bound to the copolymer. Examples of the an addition copolymer based on a glycidyl monomer include an addition copolymer comprising the residue of glycidyl acrylate, glycidyl methacrylate, or a combination thereof and the residue of methyl methacrylate, methyl acrylate, styrene, alpha-methyl styrene, butyl methacrylate butyl acrylate, or combinations thereof, for example styrene and methyl methacrylate. The addition copolymer can be present in an amount from 0 to 150 wt. % of the molten copolyester. Reacting can be at a temperature of, for example, less than or equal to 250° C.

In a specific embodiment, the molten copolyester is further reacted with the phosphate compound and the addition polymer, thereby providing the copolymer with a residue of the phosphate compound and a residue of the addition copolymer. Thus, the copolyester is manufactured by: a) reacting an aromatic polyester with a first dihydric alcohol and an aliphatic dicarboxylic acid at a temperature from 160° C. to less than 250° C. in the presence of a titanium alkoxide catalyst, to form a first mixture, wherein the dihydric alcohol is ethylene glycol, propylene glycol, butylene glycol, 1,4-butanediol tetramethyl cyclobutanediol, isosorbide, cyclohexanedimethanol, a bio-derived diol, or hexylene glycol and wherein the aliphatic dicarboxylic acid is of the general formula $(CH_2)_m(COOH)_2$, wherein m=4 to 10; (b) subjecting the first mixture to a pressure of less than 2 Torr, e.g., by vacuum distillation, and a temperature of 220 to less than 260° C. to form the copolyester; and (c) reacting the molten copolyester with a phosphate compound and an addition copolymer based on a glycidyl compound for at least 5 minutes, and thereby forming the copolyester. Reacting can be at a temperature of, for example, less than or equal to 250° C.

The biodegradable composition includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, aromatic polyesters, cycloaliphatic polyesters, polyesteramides, and the like. The polymers can be wholly or partially bio-derived, including petroleum-derived aromatic polyesters and bio-derived aromatic polyesters.

In a specific embodiment the copolyester is combined with an aliphatic polyester, for example poly(lactic acid), polyhydroxyalkanoate, poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt % and the amount of polylactic acid can range from 10 to 60 wt. %, specifically 40 to 60%, based on the total weight of the composition.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, anti-static agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration, and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In an embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, or molded, for example blow molded or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

As stated above, various combinations of the foregoing embodiments can be used.

All cited patents, patent applications, and other references are incorporated herein by reference in their entirety.

The invention is further described in the following illustrative examples in which all parts and percentages are by weight unless otherwise indicated.

EXAMPLES

Following is a list of materials, acronyms, and selected sources used in the examples.

BDO: 1,4-Butanediol (from BASF, with a purity specification of 99.5 wt. %)
TPA: Terephthalic acid (from Acros)
Boric Acid: Boric acid (from Aldrich)
ADA: Adipic Acid (from INVISTA)
Ethanol amine: Ethanol amine (from Fisher)
TPT: Tetraisopropyl titanate (from DuPont, commercial Tyzor grade)
Tyzor IAM: Titanium alkoxide phosphate (from DuPont)
PBT-co-adipate: Poly(butylene terephthalate)-co-adipate
HP: Phosphoric acid (from Acros)
Phosphorous acid: Phosphorous Acid (from Acros)
Recycled DMT: Prepared by methanolysis of Recycle PET
Recycle PET: Recycle PET in the form of flakes or pellets was obtained from a commercial vendor headquartered in India.

Examples 1-3

The purpose of Examples 1-3 was to manufacture the polyester PBT-co-adipate (PBAT) in accordance with the invention. The materials, amounts, and reaction conditions are shown in Table 1.

TABLE 1

Materials and Conditions for Comparative Example A and Examples 1-2.

| Ex. No. | Scale of Reaction (g) | TPA:BDO (mol/mol) | ADA:BDO (mol/mol) | Phosphoric Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| A* | 143 | 0.39 | 0.39 | 0:1 | 250 | 220 | 45 | 250 | 56 |
| 1 | 143 | 0.39 | 0.39 | 0.75:1 | 250 | 220 | 103 | 250 | 51 |
| 2 | 143 | 0.39 | 0.39 | 1:1 | 250 | 220 | 200 | 250 | 72 |

Comparative*

Techniques and Procedures

Comparative Example A

In Comparative Example A, 41.5 g of terephthalic acid (TPA), 36.5 g of adipic acid (ADA), and 58 g of 1,4-butanediol (BDO) were introduced into a three neck round bottom flask. The reactor was placed in an oil bath, the temperature of which was adjusted to 170° C., 250 ppm of TPT was added to the reaction mixture, and the ester interchange (EI) temperature was increased to 220° C. at a rate of 2° C./min while stirring at 260 rpm under nitrogen. The ester interchange stage was carried until the clear point was observed. The temperature of the reaction mixture was increased to 250° C. and the polymerization stage (Poly) was initiated with the vacuum adjusted to below 1 Torr for 1 hour. At the end of the polymerization, the vacuum was stopped. The resulting polymer was red.

Example 1

Example 1 was implemented in the presence of a new phosphorus-containing polyester catalyst prepared in-situ by the complexation between titanium tetraisopropoxide (TPT) and phosphoric acid in 1:0.75 mol ratio. Thus, 50 g of BDO and 0.38 ml of phosphoric acid solution in water (0.1 g/ml) were introduced into a three neck round bottom flask. The reactor was placed in an oil bath, the temperature of which was adjusted to 175° C. After 20 minutes, 250 ppm of TPT was added to the reactor and an in-situ reaction between phosphoric acid and TPT was carried for 40 minutes under inert atmosphere. Then, 41.5 g of terephthalic acid (TPA), 36.5 g of ADA, and 30 g of additional BDO were introduced into a catalyst solution and the ester interchange temperature was increased to 220° C. with a rate of 2° C./min while stirring at 260 rpm under nitrogen. The ester interchange stage was carried until the clear point was observed. The temperature of the reaction mixture was further increased to 250° C. and the polymerization was initiated with the vacuum adjusted to below 1 Torr. The polymerization was stopped after achieving desired intrinsic viscosity. The resulting copolyester exhibited a slight pink color.

Example 2

Example 2 was implemented in the presence of the new phosphorus-containing polyester catalyst prepared in situ through the complexation between TPT and phosphoric acid in 1:1 mol ratio. Thus, 41.5 g of terephthalic acid (TPA), 50 g of BDO, and 0.5 ml of phosphoric acid solution in water (0.1 g/ml) were introduced into a three neck round bottom flask. The reactor was placed in an oil bath the temperature of which was adjusted to 175° C. After 20 minutes, 250 ppm of TPT was added to the reactor and an in-situ complexation between phosphoric acid and TPT had been carried for 45 minutes under inert atmosphere. Then, 36.5 g of ADA and 30 g of additional BDO were introduced into the reaction mixture and the ester interchange temperature was increased to 220° C. at a rate of 2° C./min while stirring at 260 rpm under nitrogen. The ester interchange stage was carried until the clear point was observed. The temperature of the reaction mixture was further increased to 250° C. and the polymerization was initiated with the vacuum adjusted to below 1 Torr. The polymerization was stopped after achieving desired intrinsic viscosity. The resulting copolyester exhibited a white color.

Results

Table 2 shows the glass transition temperature (Tg), melting temperature (Tm) (obtained from DSC), molecular weight data (obtained from gel permeation chromatography (GPC)), intrinsic viscosity (I.V.), and color (L*, a*, b* values obtained through the diffuse reflectance method acquired on a Gretag Macbeth Color-Eye 7000A with D65 illumination).

TABLE 2

Results for Comparative Example A and Examples 1-2.

| Ex. No. | IV (dL/min) | $T_m$ (° C.) | $T_g$ (° C.) | PDI | Mn | Mw | L* | a* | b* | Ti (ppm) | P (ppm) |
|---|---|---|---|---|---|---|---|---|---|---|---|
| A | 1.13 | 128 | −28 | 3.2 | 34000 | 108000 | 68.7 | 20.5 | 38.2 | 185 | 7.8 |
| 1 | 1.19 | 132 | −27 | 3.5 | 34000 | 120000 | 80.6 | 3.8 | 11.5 | 163 | 87 |
| 2 | 1.31 | 123 | −27 | 3.8 | 38000 | 128000 | 82.7 | −1.1 | 1.6 | 198 | 111 |

Discussion

The novel catalyst prepared by the in situ reaction between TPT and phosphoric acid is also suitable for the polyesterification reaction between terephthalic acid, ADA, and BDO. The polyesterification using the new catalyst resulted in high molecular weight copolyester. The melting temperatures of resulting copolyesters are higher than the melting temperature of commercial PBAT. The resulting color of the copolyester is directly proportional to the mol ratio between TPT and phosphoric acid. The catalyst prepared through the 1:1 mol ratio between TPT and phosphoric acid did not form any complexation with adipic acid ester and enabled white polymer copolyester.

Examples 3-5

The purpose of Examples 3-5 was to manufacture the polyester PBT-co-adipate in accordance with the invention. The materials, amounts, and reaction conditions are shown in Table 3.

TABLE 3

Materials and Conditions for Examples 3-5.

| Ex. No. | Scale of Reaction (g) | TPA:BDO (mol/mol) | ADA:BDO (mol/mol) | Phosphorous Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 3 | 143 | 0.39 | 0.39 | 1:1 | 250 | 220 | 50 | 250 | 51 |
| 4 | 143 | 0.39 | 0.39 | 2:1 | 250 | 220 | 126 | 250 | 49 |
| 5 | 143 | 0.39 | 0.39 | 3:1 | 250 | 220 | 185 | 250 | 69 |

Techniques and Procedures

Example 3

Example 3 was implemented in the presence of a new phosphorus containing polyester catalyst prepared as in-situ through the complexation between TPT and phosphorous acid in 1:1 mol ratio. Thus, 50 g of BDO and 0.38 ml of phosphorous acid solution in water (0.12 g/ml) were introduced into a three neck round bottom flask. The reactor was placed in an oil bath the temperature of which was adjusted to 175° C. After 20 minutes, 167 ppm of TPT was added to the reactor and an in-situ reaction between phosphoric acid and TPT was carried for 40 minutes under inert atmosphere. Then, 41.5 g of terephthalic acid (TPA), 36.5 g of ADA, and 30 g of additional BDO were introduced into a catalyst solution and the ester interchange temperature was increased to 220° C. with a rate of 2° C./min while stirring at 260 rpm under nitrogen. The ester interchange stage was carried until the clear point was observed. The temperature of the reaction mixture was further increased to 250° C. and the polymerization was initiated with the vacuum adjusted to below 1 Torr. The polymerization was stopped after achieving desired intrinsic viscosity. The resulting copolyester exhibited a red color.

Example 4

Example 4 was prepared using the same procedure given in Example 2, except the in-situ catalysis, which was prepared through the complexation between TPT and phosphorous acid in 1:2 mol ratio. The resulting polymer exhibited a light pink color.

Example 5

Example 5 was prepared using the same procedure given in Example 2, except the in situ catalyst, which was prepared through the complexation between TPT and phosphorous acid in 1:3 mol ratio. The resulting polymer exhibited a light pink color.

Results

Table 4 shows the glass transition temperature (Tg), melting temperature (Tm) (obtained from DSC), molecular weight data (obtained from gel permeation chromatography (GPC)), intrinsic viscosity (I.V.), and color (L*, a*, b* values obtained through the diffuse reflectance method acquired on a Gretag Macbeth Color-Eye 7000A with D65 illumination) of Examples 4-6.

TABLE 4

Results for Examples 3-5.

| Ex. No. | IV (dL/min) | $T_m$ (° C.) | $T_g$ (° C.) | PDI | Mn | Mw | L* | a* | b* | Ti (ppm) | P (ppm) |
|---|---|---|---|---|---|---|---|---|---|---|---|
| 3 | 0.96 | 137 | −28 | 3.1 | 25000 | 78000 | 64.4 | 25.4 | 47.2 | 267 | 13 |
| 4 | 0.94 | 134 | −27 | 3.2 | 25000 | 79000 | 62.1 | 22.9 | 31.9 | 320 | 53 |
| 5 | 1.12 | 128 | −29 | 3.2 | 26000 | 84000 | 85.2 | 0.1 | 6.1 | 228 | 175 |

Discussion

The novel catalyst prepared through the in-situ reaction between TPT and phosphorous acid is also suitable for the polyesterification reaction between terephthalic acid, ADA, and BDO. The polyesterification using the new catalyst resulted in high molecular weight copolyester. The melting temperatures of resulting copolyesters are higher than the melting temperature of commercial PBAT. The resulting color of the copolyester is directly proportional to the mol ratio between TPT and phosphorous acid. The catalyst prepared through the 1:3 mol ratio between TPT and phosphoric acid did not form any complexation with adipic acid ester and enabled white polymer copolyester.

Examples 6-7

The purpose of Examples 6-7 was to manufacture the polyester PBT-co-adipate (PBAT) in accordance with the invention, in the presence of a new boron-containing polyester catalyst prepared by in situ complexation between TPT and boric acid in 1:1 mol ratio. The materials, amounts, and reaction conditions are shown in Table 5.

TABLE 5

Materials and Conditions for Examples 6-7.

| Ex. No | Scale of Reaction (g) | TPA:BDO (mol/mol) | ADA:BDO (mol/mol) | Boric Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 6 | 143 | 0.39 | 0.39 | 1:1 | 250 | 220 | 32 | 260 | 52 |
| 7 | 143 | 0.39 | 0.39 | 4:1 | 250 | 220 | 36 | 260 | 64 |

Techniques and Procedures

Example 6

In Example 6, 50 g of BDO and 0.5 ml of boric acid solution in water (0.062 g/ml) were introduced into a three neck round bottom flask. The reactor was placed in an oil bath, the temperature of which was adjusted to 175° C. After 20 minutes, 167 ppm of TPT was added to the reactor and an in-situ reaction between phosphoric acid and TPT was carried for 40 minutes under inert atmosphere. Then, 41.5 g of terephthalic acid (TPA), 36.5 g of ADA, and 30 g of additional BDO were introduced into a catalyst solution and the ester interchange temperature was increased to 220° C. with a rate of 2° C./min while stirring at 260 rpm under nitrogen. After the evolution of water ceases, the temperature of the reaction was further increased to 250° C. Polymerization was initiated with the vacuum adjusted to below 1 Torr for 50 minutes. The polymerization was stopped after achieving desired intrinsic viscosity. The resulting polymer exhibited a pink-brownish color.

Example 7

Example 7 was prepared using the same procedure given in Example 6, except the catalyst was prepared through the complexation between TPT and boric acid in 1:4 mol ratio. The resulting polymer exhibited a white color.

Results

Table 6 shows the glass transition temperature (Tg), melting temperature (Tm) obtained from DSC, molecular weight data obtained from gel permeation chromatography (GPC), intrinsic viscosity (I.V.), and color (L*, a*, b* values obtained through the diffuse reflectance method acquired on a Gretag Macbeth Color-Eye 7000A with D65 illumination).

TABLE 6

Results for Examples 6-7.

| Ex. No. | IV (dL/min) | $T_m$ (° C.) | $T_g$ (° C.) | PDI | Mn | Mw | L* | a* | b* | Ti (ppm) | B (ppm) |
|---|---|---|---|---|---|---|---|---|---|---|---|
| 6 | 0.79 | 131 | −31 | 2.7 | 22000 | 60000 | 74.2 | 18.2 | 31.2 | 320 | 120 |
| 7 | 0.64 | 131 | −28 | 2.5 | 18000 | 44000 | 87.6 | 4.4 | 16.6 | 227 | 200 |

Discussion

A novel polyesterification catalyst was prepared through the in-situ reaction between boric acid and TPT in BDO solvent. It was observed that the reactivity of the boric acid is lower compared to phosphoric acid. An important consideration in this step is to achieve a complete conversion in the reaction between the most acidic hydroxyl group of boric acid and TPT. The results indicate that PBAT was successfully prepared in accordance with the invention. The new in-situ catalyst enabled the copolyester to obtain a high molecular weight, and a white color. The melting temperatures of Examples 6-7 are very close to the melting temperature of commercial PBAT. This approach shows the use of boric acid instead of phosphoric acid for color elimination and suitable for large scale-up process. The optimum ratio between boric acid and TPT in the preparation of in situ catalyst is 4:1 to provide a white polyester.

Example 8

The purpose of Examples 8 was to manufacture the polyester PBT-co-adipate in accordance with the invention, in the presence of a new amine-containing polyester catalyst prepared in situ through the complexation between TPT and ethanol amine in 1:4 mol ratio. The materials, amounts, and reaction conditions are shown in Table 7.

TABLE 7

Materials and Conditions for Example 8.

| Ex. No. | Scale of Reaction (g) | TPA:BDO (mol/mol) | ADA:BDO (mol/mol) | Ethanol amine:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 8 | 143 | 0.39 | 0.39 | 4:1 | 250 | 220 | 30 | 260 | 45 |

Techniques and Procedures

In Example 8, 50 g of BDO and 0.5 ml of ethanol amine solution in water (0.062 g/ml) were introduced into a three neck round bottom flask. The reactor was placed in an oil bath, the temperature of which was adjusted to 175° C. After 20 minutes, 166 ppm of TPT was added to the reactor and an in situ reaction between ethanol amine and TPT were carried out for 40 minutes under inert atmosphere. Then, 41.5 g of TPA, 36.5 g of ADA, and 30 g of additional BDO were introduced into a catalyst solution and the ester interchange temperature was increased to 220° C. with a rate of 2° C./min while stirring at 260 rpm under nitrogen. After the evolution of water ceased and observation of clear solution, the temperature of the reaction was further increased to 250° C. Polymerization was initiated with the vacuum adjusted to below 1 Torr for 50 minutes. The polymerization was stopped after achieving desired intrinsic viscosity. The resulting polymer exhibited a pink color.

Results

Table 8 provides the glass transition temperature (Tg), melting temperature (Tm) obtained from DSC, molecular weight data obtained from gel permeation chromatography (GPC), intrinsic viscosity (I. V.), and color (L*, a*, b* values obtained through the diffuse reflectance method acquired on a Gretag Macbeth Color-Eye 7000A with D65 illumination).

TABLE 8

Results for Example 8.

| Ex. No. | IV (dL/min) | $T_m$ (° C.) | $T_g$ (° C.) | PDI | Mn | Mw | L* | a* | b* |
|---|---|---|---|---|---|---|---|---|---|
| 8 | 1.17 | 125 | −28 | 3.5 | 30000 | 103000 | 68.5 | 8.5 | 23.5 |

Discussion

A novel polyesterification catalyst was prepared through the in situ reaction between ethanol amine and TPT in BDO solvent. Since the ethanol amine shows a basic character comparing to phosphoric acid, phosphorous acid and boric acid, the in situ catalyst, which was prepared in a high ratio between ethanol amine and TPT, resulted in colored polyesters. The melting temperatures of Example 8 are very close to the melting temperature of commercial PBAT.

Example 9

The purpose of Examples 9 was to manufacture polyester PBT-co-adipate using a commercial catalyst. The materials, amounts, and reaction conditions are shown in Table 9.

TABLE 9

Materials and Conditions for Example 9.

| Ex. No. | Scale of Reaction (g) | TPA:BDO (mol/mol) | ADA:BDO (mol/mol) | Catalyst | Catalyst Amount (ppm) | EI Temp. (° C.) | EI Time (min) | Poly Temp. (° C.) | Poly Time (min) |
|---|---|---|---|---|---|---|---|---|---|
| 9 | 143 | 0.39 | 0.39 | Tyzor ® IAM | 250 | 220 | 30 | 260 | 45 |

Techniques and Procedures

Example 9 was implemented in the presence of Tyzor® JAM polyester catalyst. In Example 9, 41.5 g of TPA, 36.5 g of ADA, and 120 g of BDO were introduced into a three neck round bottom flask. The reactor was placed in an oil bath, the temperature of which was adjusted to 175° C. 250 ppm of Tyzor® JAM was added to the reactor and the ester interchange temperature was increased to 220° C. with a rate of 2° C./min while stirring at 260 rpm under nitrogen. After the evolution of water/ethylene glycol ceased, the temperature of the reaction was further increased to 260° C. Polymerization was initiated with the vacuum adjusted to below 1 Torr for 50 minutes. The polymerization was stopped after achieving desired intrinsic viscosity. The resulting polymer exhibited a white color.

Results

Table 10 provides the glass transition temperature (Tg), melting temperature (Tm) obtained from DSC, molecular weight data obtained from gel permeation chromatography (GPC), intrinsic viscosity (I. V.), and color (L*, a*, b* values obtained through the diffuse reflectance method acquired on a Gretag Macbeth Color-Eye 7000A with D65 illumination).

TABLE 10

Results for Example 9.

| Ex. No. | IV (dL/min) | $T_m$ (° C.) | $T_g$ (° C.) | PDI | Mn | Mw | L* | a* | b* |
|---|---|---|---|---|---|---|---|---|---|
| 9 | 1.23 | 133 | −30 | 3.5 | 32000 | 125000 | 68.5 | 8.5 | 23.5 |

Discussion

Tyzor® JAM polyester catalyst was used for the polymerization of PBAT. The melting temperature of Example 9 is very close to the melting temperature of commercial PBAT. High molecular weight polyester was obtained through this commercial catalyst.

Example 10

The purpose of Example 10 was to manufacture the polyester PBT-co-adipate in accordance with the invention, using dimethyl terephthalate (DMT) derived from a polyester (recycle DMT). The materials, amounts, and reaction conditions are shown in Table 11.

TABLE 11

Materials and Conditions for Example 10.

| Ex. No. | Scale of Reaction (g) | Recycled DMT:BDO (mol/mol) | ADA:BDO (mol/mol) | Phosphoric Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 10 | 143 | 0.39 | 0.39 | 1:1 | 250 | 220 | 32 | 250 | 62 |

Techniques and Procedures

Example 10 was conducted in the presence of the new phosphorus-containing polyester catalyst prepared by in situ complexation between TPT and phosphoric acid in 1:1 mol ratio. Thus, 48.1 g of recycled DMT, 50 g of BDO, and 0.5 ml of phosphoric acid solution in water (0.1 g/ml) were introduced into a three neck round bottom flask. The reactor was placed in an oil bath the temperature of which was adjusted to 175° C. After 20 minutes, 250 ppm of TPT was added to the reactor and an in-situ complexation between phosphoric acid and TPT had been carried for 45 minutes under inert atmosphere. Then, 36.5 g of ADA and 30 g of additional BDO were introduced into the reaction mixture and the ester interchange temperature was increased to 220° C. at a rate of 2° C./min while stirring at 260 rpm under nitrogen. The ester interchange stage was carried until the clear point was observed. The temperature of the reaction mixture was further increased to 250° C. and the polymerization was initiated with the vacuum adjusted to below 1 Torr. The polymerization was stopped after achieving desired intrinsic viscosity. The resulting copolyester exhibited a white color.

Results

Table 12 shows the glass transition temperature (Tg), melting temperature (Tm) (obtained from DSC), molecular weight data (obtained from gel permeation chromatography (GPC)), intrinsic viscosity (I.V.), and color (L*, a*, b* values obtained through the diffuse reflectance method acquired on a Gretag Macbeth Color-Eye 7000A with D65 illumination).

TABLE 12

Results for Example 10.

| Ex. No. | IV (dL/min) | $T_m$ (° C.) | $T_g$ (° C.) | PDI | Mn | Mw | L* | a* | b* |
|---|---|---|---|---|---|---|---|---|---|
| 10 | 1.29 | 116 | −29 | 3.7 | 33000 | 122000 | 77.4 | −11.0 | 4.6 |

Discussion

The novel catalyst prepared through the in situ reaction between TPT and phosphoric acid is also suitable for the polyesterification reaction between recycled DMT, ADA, and BDO. The polyesterification using the new catalyst resulted in high molecular weight copolyester. The melting temperatures of resulting copolyesters are higher than the melting temperature of commercial PBAT. The resulting color of the copolyester is directly proportional to the mol ratio between TPT and phosphoric acid. The catalyst prepared through the 1:1 mol ratio between TPT and phosphoric acid did not form any complexation with adipic acid ester and enabled white polymer copolyester.

Although the present invention has been described in detail with reference to certain preferred versions thereof, other variations are possible. Therefore, the spirit and scope of the appended claims should not be limited to the description of the versions contained therein.

What is claimed is:

1. A biodegradable aliphatic-aromatic copolyester, comprising a polymerization reaction product of a:
   (a) a dihydric alcohol;
   (b) an aromatic dicarboxy compound selected from an aromatic dicarboxylic acid, aromatic dicarboxylic ($C_1$-$C_3$)alkyl ester, or a combination thereof; and
   (c) an adipic acid; in the presence of
   wherein the copolyester is the product of polymerization in the presence of a titanium catalyst that is a reaction complex comprising titanium and a color-reducing amount of a compound selected from phosphoric acid, phosphorous acid, boric acid, and combinations thereof;
   wherein the aliphatic-aromatic copolyester has a number average molecular weight of at least 20,000 Daltons and a polydispersity index from 2 to less than 6.

2. The copolyester of claim 1,
   wherein the aromatic dicarboxy compound is derived from recycled PET, and
   wherein the copolyester further comprises a dimethyl terephthalate residual composition.

3. The copolyester of claim 2, wherein the dimethyl terephthalate residual composition comprises
   (a) dimethyl terephthalate
   (b) more than 0 to less than 10 wt % based upon the dimethyl terephthalate of a residual component selected from dimethyl isophthalate, cyclohexane dimethanol, diethylene glycol, triethylene glycol, and a combination thereof.

4. The copolyester of claim 1, wherein the dihydric alcohol is selected from ethylene glycol, 1,2-propylene glycol, 1,3-propylene glycol, 1,2-butanediol, 2,3-butanediol, 1,4-butanediol, tetramethyl cyclobutanediol, isosorbide, hexylene glycol, 1,3-cyclohexanedimethanol isomers, 1,4-cyclohexanedimethanol isomers, a bio-derived diol, or a combination thereof.

5. The copolyester of claim 1, wherein the dihydric alcohol is selected from 1,4-butanediol, 1,3-propanediol, ethylene glycol, and combinations thereof.

6. The copolyester of claim 1, wherein the aromatic dicarboxylic acid is selected from terephthalic acid or di(C1-3)alkyl ester thereof, isophthalic acid or di(C1-3)alkyl ester thereof, naphthalic acid or di(C1-3)alkyl ester thereof, and a combination thereof.

7. The copolyester of claim 1, wherein the aromatic dicarboxylic acid group is derived from terephthalic acid or di(C1-3)alkyl ester thereof.

8. The copolyester of claim 4, further comprising isophthalic acid groups.

9. The copolyester of claim 1, wherein the titanium catalyst reaction complex comprises the reaction product of
   tetraisopropyl titanate and
   a reactant selected from
   (1) a phosphorus-containing compounds selected from the group consisting of phosphoric acid, phosphorous acid, and combinations thereof, at a molar ratio of the phosphorus-containing compound:tetraisopropyl titanate from more than 0.5:1 to less than or equal to 3:1,
   (2) boric acid, at a molar ratio of the boron-containing compound:tetraisopropyl titanate from more than 0.5:1 to less than or equal to 4:1, and
   (3) combinations thereof.

10. The copolyester of claim 1, wherein the copolyester comprises from more than 0 to less than 300 ppm of the phosphoric acid and/or phosphorous acid, based on the total weight of the copolyester.

11. The copolyester of claim 1, wherein the copolyester contains from more than 0 to less than 300 ppm of boric acid, based on the total weight of the copolyester.

12. The copolyester of claim 1, having a Tg from −35° C. to 0° C. and a Tm from 90° C. to 160° C.

13. The copolyester of claim 1, wherein the copolyester has a whiteness of at least L*=74.0; a*=−11.0; b*=20.0: as determined by a colorimeter using D65 illumination.

14. A composition, comprising a combination of:
   (i) from more than 10 to 59.99 wt. %, based on the total weight of the composition, of the biodegradable aliphatic-aromatic copolyester of claim 1;
   (ii) from more than 40 to less than 89.99 wt. %, based on the total weight of the composition, of a member selected from aliphatic polyesters, aliphatic polycarbonates, starches, aromatic polyesters, cycloaliphatic polyesters, polyesteramides, aromatic polycarbonates, and combinations thereof;
   (iii) from 0.01 to 5 wt. %, based on the total weight of the composition, of an additive selected from a nucleating agent, antioxidant, UV stabilizer, plasticizer, epoxy compound, melt strength additive, or a combination thereof;
   (iv) from 0.01 to 45 wt. %, based on the total weight of the composition, of an additive selected from alcohols, acetates, alcohol-acetate copolymers, and combinations thereof; and
   (v) from 0.01 to 2 wt %, based on the weight of the composition, of an additive selected from crosslinkers, anti-aging agents, retrogradation agents, anti-blocking agents, water, odor-controlling agents, and combinations thereof.

15. The composition of claim 14, wherein the aliphatic polyester is selected from poly(lactic acid)s, poly(hydroxyalkanoate)s, poly(butylene succinate)s, poly(butylene adipate)s, poly(butylene succinate adipate)s, poly(caprolactone)s, and combinations thereof.

16. An article extruded, calendared, extrusion molded, blow molded, solvent cast or injection molded from the biodegradable composition of claim 14.

17. The article of claim 16, wherein the article is a film.

18. The film of claim 17, wherein the film is formed by extrusion molding or calendaring the biodegradable composition.

19. A process for making the biodegradable aliphatic-aromatic copolyester of claim 1, the process comprising
   a) reacting
      (1) an aromatic dicarboxy compound selected from an aromatic dicarboxylic acid, aromatic dicarboxylic (C1-3)alkyl ester, or a combination thereof,
      (2) an adipic acid component selected from adipic acid, adipic acid oligomers, and combinations thereof, and
      (3) a dihydric alcohol, in the presence of
      (4) said color reducing compound; and
   b) subjecting the reaction mixture to vacuum, optionally with distillation, at a pressure of less than 2 Torr and a temperature of 220 to less than 270° C., to form the molten aliphatic-aromatic copolyester.

20. The process of claim 19, wherein titanium catalyst composition comprises a reaction product of
   tetraisopropyl titanate and
   a reactant selected from
   (1) a phosphorus compound that is phosphoric acid and/or phosphorous acid, at a molar ratio of the phosphorus containing compound:tetraisopropyl titanate from more than 0.5:1 to less than or equal to 3:1,
   (2) boric acid, at a molar ratio of the boron compound: tetraisopropyl titanate from more than 0.5:1 to less than or equal to 4:1, or
   (3) a combination thereof.

21. A biodegradable aliphatic-aromatic copolyester, comprising a polymerization reaction product of a:
   (a) a dihydric alcohol;
   (b) an aromatic dicarboxy compound selected from an aromatic dicarboxylic acid, aromatic dicarboxylic ($C_1$-$C_3$)alkyl ester, or a combination thereof; and
   (c) an adipic acid; in the presence of
   wherein the copolyester is the product of polymerization in the presence of a titanium catalyst that is a reaction complex comprising titanium and a color-reducing amount of a compound selected from phosphoric acid, phosphorous acid, boric acid, and combinations thereof wherein the titanium catalyst reaction complex comprises the reaction product of
tetraisopropyl titanate and
a reactant selected from
(1) a phosphorus-containing compound selected from the group consisting of phosphoric acid, phosphorous acid, and combinations thereof, at a molar ratio of the phosphorus-containing compound:tetraisopropyl titanate from more than 0.5:1 to less than or equal to 3:1,
(2) boric acid, at a molar ratio of the boron-containing compound:tetraisopropyl titanate from more than 0.5:1 to less than or equal to 4:1, and
(3) combinations thereof;
wherein the aliphatic-aromatic copolyester has a number average molecular weight of at least 20,000 Daltons and a polydispersity index from 2 to less than 6; and
wherein the copolyester has a Tg from −35° C. to 0° C. and a Tm from 90° C. to 160° C., and a whiteness of at least L*=74.0; a*=−11.0; b*=20.0: as determined by a colorimeter using D65 illumination.

* * * * *